US 6,684,712 B2

United States Patent
Klein et al.

(10) Patent No.: US 6,684,712 B2
(45) Date of Patent: Feb. 3, 2004

(54) MEASURING INSTRUMENT FOR A PRESSURE GAUGE

(75) Inventors: Kurt Klein, Klingenberg (DE); Detlef Wahl, Erlenbach (DE); Heiko Schliessmann, Eschau (DE); Helmut Berninger, Obernburg (DE); Bernd Friebe, Neu-Anspach (DE); Burkard Meisenzahl, Bürgstadt (DE)

(73) Assignee: Wika Alexander Wiegand GmbH & Co. (DE)

( * ) Notice: Subject to any disclaimer, the term of this patent is extended or adjusted under 35 U.S.C. 154(b) by 85 days.

(21) Appl. No.: 09/887,786

(22) Filed: Jun. 21, 2001

(65) Prior Publication Data

US 2001/0029787 A1 Oct. 18, 2001

Related U.S. Application Data

(62) Division of application No. 09/353,264, filed on Jul. 14, 1999.

(30) Foreign Application Priority Data

Jul. 24, 1998 (EP) .......................... 98 113 938

(51) Int. Cl.$^7$ ................................. G01L 7/04
(52) U.S. Cl. .............................. 73/732; 73/742; 73/717
(58) Field of Search .................. 73/732, 742, 718, 73/738, 741, 704, 740, 711, 756, 717, 745, 749; 29/412, 450

(56) References Cited

U.S. PATENT DOCUMENTS

| | | | | |
|---|---|---|---|---|
| 3,908,462 A | * | 9/1975 | Alinari ........................ 73/741 |
| 4,051,730 A | * | 10/1977 | Andrews et al. ............... 73/738 |
| 4,100,812 A | * | 7/1978 | Gray et al. ..................... 73/732 |
| 4,173,150 A | * | 11/1979 | Gray ............................. 73/714 |
| 4,825,699 A | * | 5/1989 | Der-Ming ...................... 73/740 |
| 5,533,414 A | * | 7/1996 | Huang ......................... 73/866.1 |
| 5,581,029 A | * | 12/1996 | Wahl et al. .................... 73/741 |
| 5,895,861 A | * | 4/1999 | Slonaker ...................... 73/732 |
| 6,044,712 A | * | 4/2000 | Cannett et al. |
| 6,314,816 B1 | * | 11/2001 | Wiegand ...................... 73/742 |

* cited by examiner

*Primary Examiner*—Edward Lefkowitz
*Assistant Examiner*—Marissa Ferguson
(74) *Attorney, Agent, or Firm*—Mayer, Brown, Rowe & Maw LLP

(57) ABSTRACT

The measuring instrument for a pressure gauge comprises an indicator unit with two plates that bear rotatably an indicator shaft carrying a pinion and that furthermore bear a gear segment. The measuring instrument furthermore comprises a metal Bourdon tube bent into an arc shape, which is soldered on one end to a spring carrier and on the other to a spring end-piece. The spring end-piece is connected to the gear segment such that the displacement of the spring end-piece because of the measurement pressure is transferred to the gear segment. The spring end-piece constitutes a part that is rigidly attached to one of the two plates prior to the Bourdon tube being soldered to the spring end-piece and that is separated from this plate once the Bourdon tube has been soldered to the spring end-piece. During the course of the manufacture of this measuring instrument, the spring end-piece is produced as a part that is securely joined to the two plates. The Bourdon tube is soldered to the spring end-piece while the latter is still rigidly affixed to the plate. It is not until thereafter that the spring end-piece is separated form the plate. Preferably the spring carrier is integral to or attached to one of the two plates. The spring end-piece assumes its target position with greater accuracy with respect to the indicator unit.

15 Claims, 2 Drawing Sheets

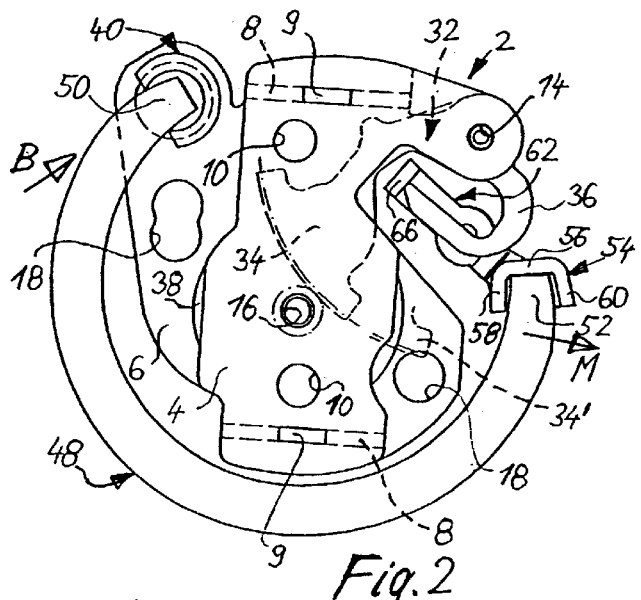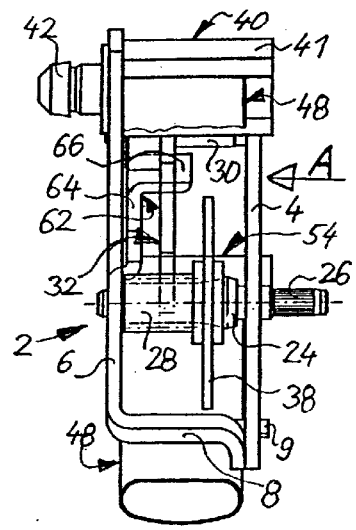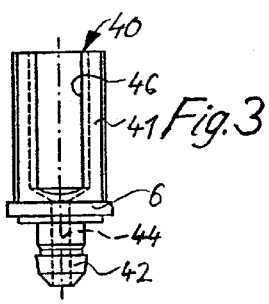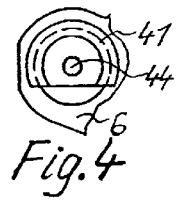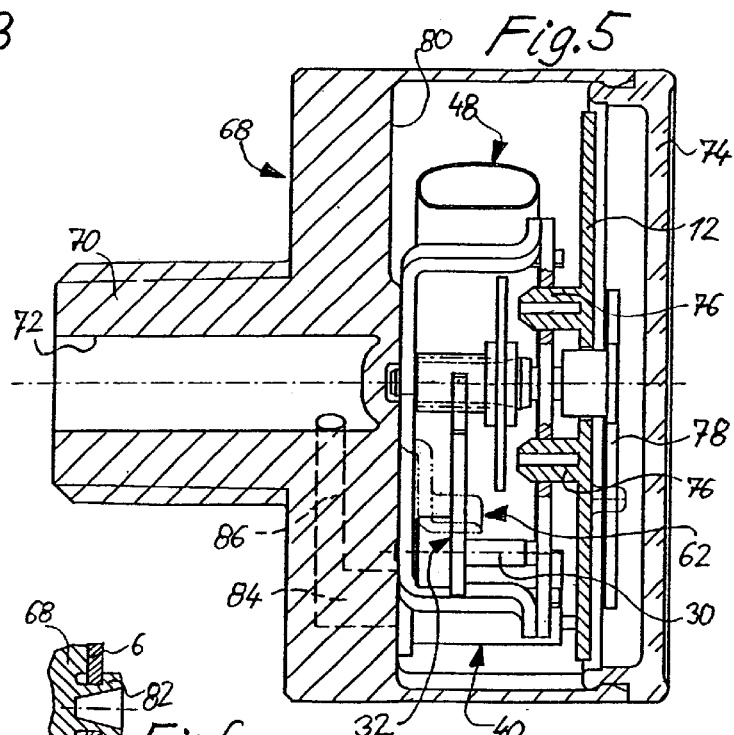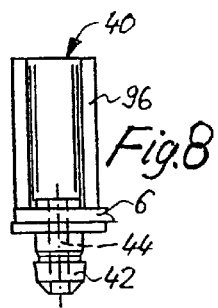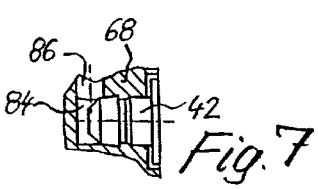

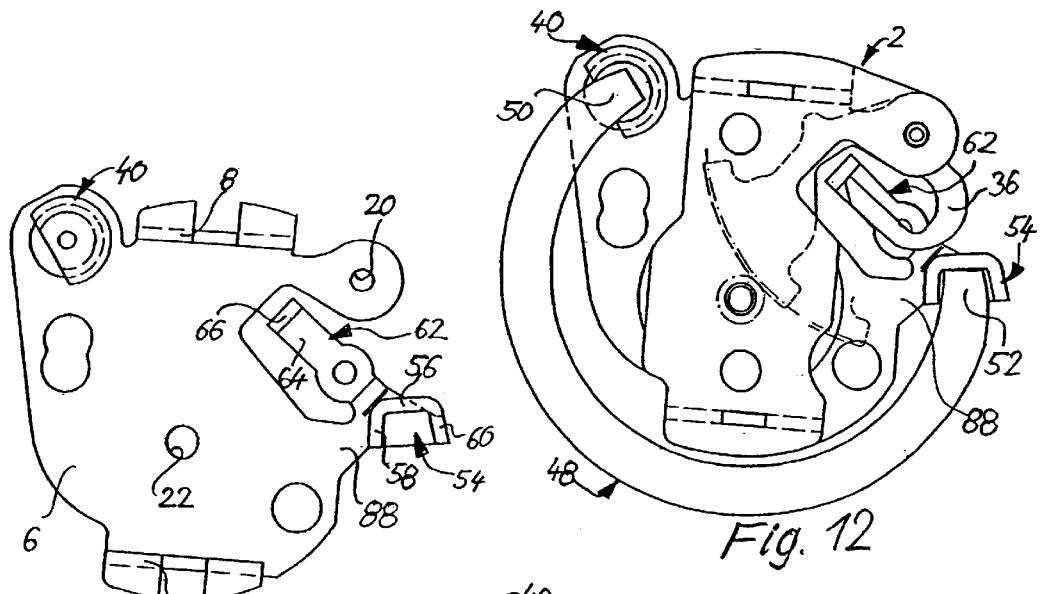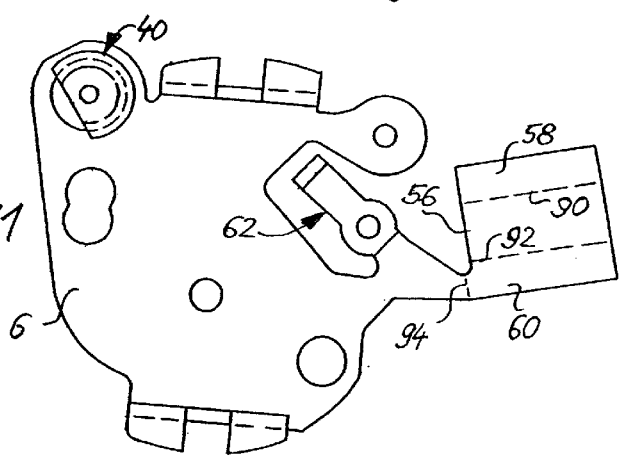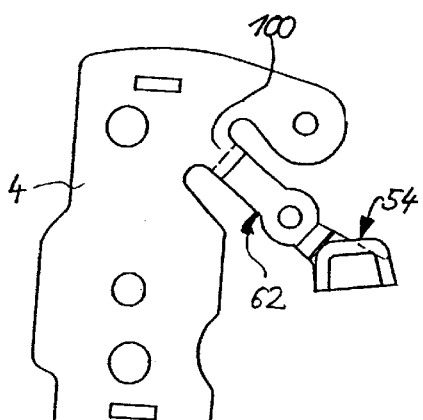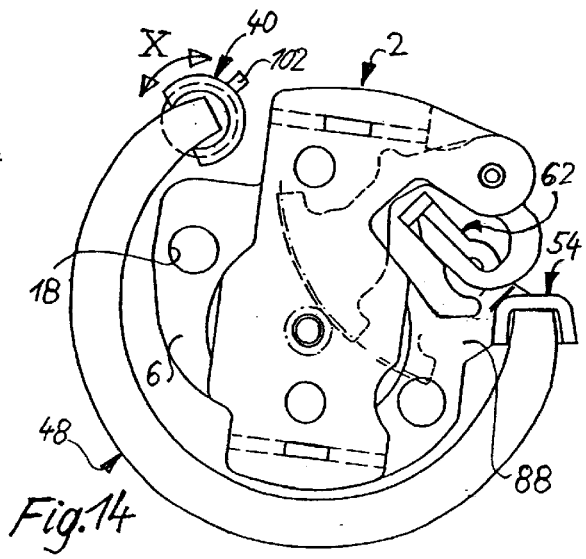

MEASURING INSTRUMENT FOR A PRESSURE GAUGE

This is a divisional of U.S. patent application Ser. No. 09/353,264 entitled "Measuring System for a Pressure Gauge and Method for Manufacturing" now issued, filed Jul. 14, 1999 which claims priority based on European patent application 98113938.9, filed Jul. 24, 1998, both of which are hereby incorporated by reference.

BACKGROUND OF THE INVENTION

The invention is a novel measuring instrument for a pressure gauge and a novel method for manufacturing a measuring instrument for a pressure gauge.

Measuring instruments for measuring pressure and methods for manufacturing them are known. The known measuring instrument can include a dial placed upon a front plate and an indicator placed upon an indicator pin. The unit comprising the measuring instrument, dial plate, and indicator can be arranged in a housing that carries a window in front of the dial plate. These elements together constitute a pressure gauge.

The known measuring instrument generally comprises a spring carrier, Bourdon tube, spring end-piece and an indicator unit. The measuring instrument together with the dial plate and an indicator are placed in a housing to form a pressure gauge. The indicator unit includes a bottom plate and gear segment. The gear segment includes a lever segment. The spring carrier generally comprises a cuboidal metal component with an integral bored device connector on one side and a channel on the other side. The device connector, which frequently embodies a threaded stem, connects the pressure gauge to a system so that measurement pressure (i.e., the pressure to be measured) is placed in communication with the channel. The one end of the Bourdon tube is inserted into the channel and soldered to the spring carrier. The other end of the Bourdon tube is soldered to the spring end-piece such that the other end is closed so as to be pressure-proof. The measurement pressure goes through the device connector into the curved Bourdon tube, which straightens to an extent that depends on the measurement pressure, so that its other end (and therefore the spring end-piece) is displaced. In the known system, the spring end-piece is flexibly joined to the lever section of the gear segment by means of a pull rod, so that the displacement of the spring end-piece is converted to rotation of the indicator shaft. The indicator on the dial indicates the prevailing measurement pressure.

In the course of manufacturing the known measuring instrument, the one end of the Bourdon tube is soldered to the spring carrier and the spring end-piece is soldered to the other end of the Bourdon tube. The indicator unit is assembled in parallel. The assembled indicator unit is then attached to the spring carrier. This is generally accomplished by bolting the bottom plate of the indicator unit to the spring carrier. Care must be taken that the Bourdon tube and the spring end-piece assume their target positions relative to the indicator unit as precisely as possible, especially relative to the axis of rotation of the gear segment, because the accuracy of the pressure measurement and the pressure indicator are affected by the accuracy with which these target positions are maintained. Once the indicator unit has been attached to the spring carrier, the pull rod is flexibly joined both to the spring end-piece and to the lever section of the gear segment so that displacement of the spring end-piece can be transmitted to the lever section.

The manufacture of this known measuring instrument is relatively labor-intensive and complex due to the steps described in the foregoing. In addition, there is no guarantee that the Bourdon tube and the spring end-piece will occupy their geometric target positions relative to the indicator unit. This can make it necessary to calibrate the measuring instrument, which can be more or less complex depending on the accuracy requirements for the instrument.

A known measuring instrument and a method for its manufacture are disclosed in the publication DE 23 54 473 C2. In this known measuring instrument, the spring carrier embodies either a metal piece that is bolted to the top plate into which piece the one end of the Bourdon tube is fixed air-tight, or it embodies a sheet-metal tab that either comprises a single piece with the top plate or is a separate piece that is bolted to said plate. If the spring carrier comprises a sheet-metal tab, the one end of the Bourdon tube is pushed onto the sheet-metal tab during the course of manufacture. In addition, a tube for feeding the measurement pressure is pushed into the one end of the Bourdon tube. The sheet-metal tab, the tube, and the one end of the Bourdon tube are then welded together. In this known measuring instrument, when the spring carrier is bolted to the plate of the indicator unit, the complexity of manufacturing and calibrating the measuring instrument is similar to that of the known measuring instrument described in the foregoing. If the sheet-metal tab constituting the spring carrier and the upper plate embody a single piece, it is true that joining the one end of the Bourdon tube to the spring carrier and manufacturing a fixed connection between this end of the Bourdon tube and the indicator unit comprise one step. However, the spring end-piece does not occupy a defined position with reference to the indicator unit with sufficient precision, so that the accuracy of the pressure indicator is poor or cannot be increased without more complex calibration.

The object of the invention is to further develop the generic measuring instrument such that the calibration complexity it requires is diminished. In other words, this means that the instrument should have comparatively high indicator accuracy even prior to calibration. Furthermore, manufacture of the measuring instrument is simplified.

Furthermore, the object of the invention is to further develop the generic manufacturing method such that the manufacture of the measuring instrument is simplified and such that a measuring instrument that indicates pressure with comparatively more accuracy is created with low manufacturing complexity.

The object in terms of the measuring instrument is achieved by a novel measuring instrument. This novel measuring instrument is distinguishable in that the spring end-piece constitutes a separate part that is attached to one of the two plates of the indicator unit prior to joining the Bourdon tube to the spring end-piece and detached from this plate after the Bourdon tube has been affixed to the spring end-piece. Since, the part constituting the spring end-piece is affixed to one of the two plates prior to being joined to the Bourdon tube, the spring end-piece assumes a defined position with respect to the elements of the indicator unit, especially with respect to the axis of rotation of the gear segment. During the course of manufacturing the plate to which the spring end-piece is attached, the position of the spring end-piece can be made to coincide with great accuracy with its target position. While the other end of the Bourdon tube is being rigidly joined to the spring end-piece, the latter is held almost exactly in its target position because it is affixed to the plate, and then maintains this target position even after it is separated from the plate. In this manner a measuring instrument is created that possesses comparatively high indicator accuracy even without calibration.

In one embodiment, the spring carrier is affixed to one of two plates. The spring carrier and the plate to which the spring carrier is affixed comprises a single metal sheet, which is bent in the shape of a cap with a U-shaped cross-section. Alternatively, the spring carrier can be a separate piece that is affixed to one of the two plates, wherein it embodies a sleeve and a connecting pin. The sleeve comprises a slit running in its longitudinal direction for accommodating one end of the Bourdon tube and a bore that opens into the interior space of the sleeve. The connecting pin is integral to the slit. In accordance with both of these aforesaid alternatives, the spring carrier is particularly compact and integrated into the indicator unit in a particularly useful manner. It is useful to employ these two alternative embodiments in a measuring instrument, even if the spring end-piece does not constitute a part attached to one of the two plates prior to being rigidly joined to the spring end-piece. Attaching the spring carrier to one of the two plates has the advantage that the spring carrier can be used as a device for positioning the one end of the Bourdon tube while the other end of the Bourdon tube is being joined to the spring end-piece and thus there is no need for a separate positioning apparatus.

The indicator unit comprises a preload spring that exerts a preload force on the gear segment. The indicator unit is rigidly joined to the spring end-piece which serves as a stop limit. The lever section of the gear segment is engaged with the stop limit due to the preload force of the preload spring. In this embodiment, the lever section of the gear segment always follows the movement (i.e., displacement) of the spring end-piece so that there is no need for a pull rod for creating the connection between the spring end-piece and the lever section of the gear segment. This connection without a pull rod can also be employed advantageously in measuring instruments in which the spring end-piece does not constitute a piece attached to one of the two plates prior to the Bourdon tube being joined to the spring end-piece.

With respect to the method, the object is achieved by a novel method. In accordance with the invented method, the spring end-piece is produced as a part securely joined to one of the two plates so that the spring end-piece is a component of the assembled indicator unit, so that the spring end-piece is brought into communication with the lever section prior to the other end of the Bourdon tube being rigidly joined to the spring end-piece. The other end of the Bourdon tube is rigidly joined to the spring end-piece while the latter is attached to the plate. Once the Bourdon tube has been joined to the spring end-piece, the spring end-piece is separated from the plate. This is a simple approach for creating a measuring instrument that has comparatively high indicator accuracy even without calibration, as has been explained previously.

In an alternative embodiment of the invented method, the spring carrier is integral to or affixed to one of the plates of the indicator unit before being joined to the end of the Bourdon tube, so that the spring carrier is a component of the assembled indicator unit. One end of the Bourdon tube is inserted into the spring carrier then the other end of the Bourdon tube is rigidly joined to the spring end-piece. In this case the position of the Bourdon tube is predetermined and fixed by the spring carrier while it is being joined to the spring end-piece. Therefore, no positioning apparatuses are required for this purpose.

Furthermore, in another alternative embodiment of the invented method, one end of the Bourdon tube is joined to the spring carrier at the same time that the other end of the Bourdon tube is joined to the spring end-piece. In this approach, the conventional steps of soldering the Bourdon tube to the spring carrier, soldering the Bourdon tube to the spring end-piece, and rigidly joining the indicator unit to the Bourdon tube are combined in a single manufacturing step.

DESCRIPTION OF THE DRAWINGS

Exemplary embodiments of the invention are explained in greater detail in the following using the drawings.

FIG. 1 is a side cross-sectional view of an exemplary embodiment of the invented measuring instrument;

FIG. 2 is a cross-sectional view of the measuring instrument as indicated by arrow A in FIG. 1;

FIG. 3 is a cross-sectional view of a spring carrier as indicated by arrow B in FIG. 2;

FIG. 4 is a top view of a spring carrier;

FIG. 5 is a cross-sectional view of a pressure gauge;

FIG. 6 is a cross-sectional view of the measuring instrument of the pressure gauge;

FIG. 7 is a cross-sectional view of a pressure connection for the pressure gauge;

FIG. 8 is an alternate embodiment of the spring carrier;

FIG. 9 is another alternate embodiment of the spring carrier;

FIG. 10 illustrates a bottom plate prior to its insertion into the indicator unit;

FIG. 11 illustrates the bottom plate during its manufacture;

FIG. 12 illustrates the measuring instrument during its manufacture;

FIG. 13 illustrates an alternate embodiment of a top plate; and

FIG. 14 illustrates an alternate embodiment of a measuring instrument.

The same reference symbols are always used in the figures for the same elements or for corresponding elements.

DETAILED DESCRIPTION OF THE INVENTION

The exemplary embodiment of a measuring instrument illustrated in FIGS. 1 through 4 comprises an indicator unit 2, which includes a top plate 4 and a bottom plate 6. As FIG. 1 particularly illustrates, the top plate 4 and the bottom plate 6 are positioned at a distance from and parallel to each other. The top plate 4 is planar, made of metal sheet, and manufactured by punching. The bottom plate 6 comprises a planar main section, is likewise made of metal sheet, and is manufactured by punching and bending. Integral to the planar main section of the bottom plate 6 are two tabs 8 that are bent upward about 90° toward the top plate 4 and to which the top plate 4 is adjacent. Each tab 8 comprises an extension 9 that projects through a corresponding opening in the top plate 4 and is caulked there. The top plate 4 and the bottom plate 6 are securely joined to each other in this manner.

The top plate 4 is provided with two fixing holes 10 that are used to affix a dial 12 to the top plate 4 (see FIG. 5). Furthermore, there is one bearing hole 14 and one bearing hole 16 in the top plate 4. There are two mounting holes 18 and two bearing holes 20 and 22 in the bottom plate (see FIG. 10).

An indicator shaft 24 is rotatably supported in the bearing hole 16 and in the bearing hole 22. The indicator shaft 24 comprises at its end an indicator pin 26 that projects through plate 4 in the manner illustrated in FIG. 1. This plate 4 will be referred to as the "top plate" in the ensuing description and claims because it is the plate from which the indicator pin 26 projects.

A pinion 28 securely joined to the indicator shaft 24 is positioned between the two plates 4 and 6.

A shaft 30 of a gear segment 32 positioned between the two plates 4 and 6 is supported in the bearing holes 14 and 20. In the illustrated exemplary embodiment, the gear segment 32 embodies a two-armed lever, the one arm of which constitutes a toothed section 34 and the other arm of which constitutes a lever section 36. The toothed section 34 and the lever section 36 lie in a plane that is parallel to the planes of the plates 4 and 6. The lever section 36 is bent into a U shape in this plane. The toothed section 34 engages the pinion 28.

Also positioned between the two plates 4 and 6 is a preload spring 38 constituting a spiral spring, the one end of which is connected to the indicator shaft 24 and the other end of which is fixed to the bottom plate 6 (not shown). Referring to FIG. 2, the preload spring 38 exerts a preload moment in the counter-clockwise direction on the pinion 28, which, because the pinion 28 and the toothed section 34 are engaged, leads to an elastic preload force on the gear segment 32 which attempts to rotate the latter in the clockwise direction.

A spring carrier 40 embodied as a sleeve 41 is affixed to the bottom plate. Integral to the lower end of the sleeve 41 as illustrated in FIG. 3 is a connecting pin 42 with a concentric bore 44 that opens into the interior space of the sleeve. The sleeve 41 is seated on the front side of the bottom plate 6, as can be seen in FIG. 2, and the connecting pin 42 runs through a hole in the bottom plate 6 so that it projects from its back side, as illustrated in FIGS. 1 and 3. The sleeve 41 constituting the spring carrier 40 is affixed to the bottom plate by means of caulking. The sleeve 41 is open at its upper end in FIG. 3 and comprises a slit 46 that extends in its longitudinal direction.

In addition to the indicator unit 2 explained in the foregoing and the spring carrier 40 integrated with the indicator unit, the measuring instrument comprises a metal Bourdon tube 48 bent into an arc shape. Its one end 50 extends through the slit 46 into the interior space of the sleeve 41 and is rigidly joined by means of soldering to the sleeve 41 of spring carrier 40. The solder is not shown in FIG. 2. The measurement pressure can enter into the interior of the Bourdon tube 48 through the bore 44 in the connecting pin 42 and through the interior space of the sleeve 41. The connection between the one end 50 of the Bourdon tube 48 and the spring carrier 40 is otherwise sealed against pressure. In this manner the one end 50 of the Bourdon tube 48 is rigidly joined to the indicator unit 2 and fixed in its position relative to the indicator unit 2.

The Bourdon tube 48 extends around the indicator unit 2 in an arc of approximately 270 degrees, as shown in FIG. 2. At its other end 52, the Bourdon tube 48 carries a spring end-piece 54 that is rigidly joined to the other end 52 thereof in a closed, sealed manner by means of soldering. The solder is not shown in FIG. 2. The spring end-piece 54 is originally affixed to bottom plate 6. It is then separated from the bottom plate 6 after it is soldered to the other end 52 of Bourdon tube 48.

The foregoing has stated that the one end 50 of the Bourdon tube 48 is soldered to the spring carrier 40 and that the other end 52 of the Bourdon tube 48 is soldered to the spring end-piece 54. In the exemplary embodiment described, the soldering is such that a rigid connection of the two ends of the Bourdon tube 48, the one end to the spring carrier 40 and the other end to the spring end-piece 54 is achieved. This connection does not necessarily have to be a soldered connection, however. On the contrary, other types of connections can also be used, including, in particular, welding. This is true of the entire description including the following explanation of the method for manufacturing the measuring instrument. In the description that follows, other methods for manufacturing a rigid connection can always be used even if the term "soldering" and similar terminology are used.

In this first embodiment, the spring end-piece 54 includes a cap that comprises a base 56 and two side walls 58 and 60. The base 56 and the two side walls 58 and 60 are made from the same metal sheet as the bottom plate 6. The cap is formed by bending the side walls 58 and 60 and the base 56 relative to each other. The spring end piece 54 also includes in a single piece an L-shaped projection 62, whose leg 64 runs parallel to the plane of the two plates 4 and 6. The other leg 66 of the projection 62 extends essentially perpendicular to the planes of the two plates 4 and 6 and constitutes a stop limit for the U-shape lever section 36. Due to the preload force exerted by the preload spring 38, the free end of the lever section 36 pushed up against the side of the leg 66 facing the spring end-piece 54.

FIGS. 1 and 2 illustrate the measuring instrument in the pressure-less condition. Referring to FIG. 2, when the measurement pressure enters the Bourdon tube 48 and is higher than the ambient pressure exerted on the Bourdon tube 48 from outside, the Bourdon tube 48 expands and its other end 52 is thereby displaced in the direction of the arrow M shown in FIG. 2. The spring end-piece 54 is therefore, also displace in the same direction, and, as a consequence, the leg 66 swivels the gear segment 32 in the counter-clockwise direction which causes the indicator shaft 24 to rotate corresponding to the displacement. FIG. 2 also illustrates the toothed section 34 in its final position 34', which corresponds to the maximum pressure measured by the measuring instrument.

FIG. 5 illustrates a pressure gauge in which the measuring instrument in accordance with FIGS. 1 through 4 is used. The pressure gauge comprises a housing 68 to which belongs a device connector 70 that includes a threaded stem which includes an exterior thread and a blind hole 72 embodied in the threaded stem. The device connector 70 connects the pressure gauge to a system, the pressure of which is to be measured. A transparent window 74 is inserted into the side of the housing 68 that faces away from the device connector 70. The measuring instrument is arranged in the space surrounded by the housing 68 and the window 74 such that its top plate 4 faces the window 74. The dial 12 is affixed to the top plate 4 of the measuring instrument by the use of two pins 76 integral to the dial 12 which project into the fixing holes 10 in the top plate 4. An indicator 78 is placed onto the indicator pin 26. Its position over the dial 12 is visible through the window 74 so that the pressure it indicates on the dial 12 can be read.

In FIG. 5, the projection 62 that is located in front of the drawing plane of FIG. 5 is drawn in with the dashed line. The measuring instrument 2 in FIG. 5 is illustrated in a position that results from rotating the measuring instrument in the position illustrated in FIG. 1 around the axis of the indicator shaft 24 approximately 180 degrees.

Integral to the interior wall 80 of the housing 68 at locations that correspond to the fixing holes 10 in the bottom plate 6 are projections 82. These projections 82 are not shown in FIG. 5. However, one of these projections 82 is shown in FIG. 6. In order to attach the measuring instrument to the housing 68, the bottom plate 6 is arranged at the interior wall 80 such that the projections 82 penetrate through the fixing holes 10. Then the projections 82 are expanded and flattened such that they assume the shape shown in FIG. 6. In this manner the bottom plate 6 is fastened to the housing 68 and the entire measuring instrument is thus attached to the housing.

In the housing 68 is a bore 84 that at its one end communicates with the blind hole 72 via a channel 86 and that opens at its other end into the interior wall 80. The bore 84 is dimensioned and positioned such that it accommodates the connecting pin 42 in a sealed manner when the measuring instrument is attached to the housing 68 in the manner described in the foregoing. FIG. 7 illustrates the pressure connection created in this manner between the measuring instrument and the housing. Although FIG. 5 shows the bore 84, it does not show the connecting pin 42 inserted therein.

When operating, the measurement pressure runs through the blind hole 72, the channel 86, the bore 84, the bore 44 in the connecting pin 42 in the spring carrier 40 into the Bourdon tube 48. The Bourdon tube's other end 52 and the spring end-piece 54 are displaced to an extent that depends on the measurement pressure. This displacement is transferred via the gear segment 32 and the pinion 28 to the indicator 78.

As can be seen from the foregoing description, the connecting pin 42 of the measuring instrument does not also constitute the device connector for the pressure gauge. Rather, the device connector 72 and the connecting pin 42 are two different elements. This makes it possible to install the same measurement instrument into pressure gauges that differ in terms of device connectors. For instance, the pressure gauge illustrated in FIG. 5 can be modified such that the device connector 70 on the back side is replaced with a radial device connector. This connector includes a radial, threaded stem that can project downward from the housing 68. If a radial device connector is used, the channel 86 would merely have to run in a course different from that illustrated. The measuring instrument, including its connecting pin 42, does not need to be converted in this case, but rather can retain the embodiment described in FIGS. 1 through 4.

Referencing FIGS. 10 through 12, the following explains the individual steps in the method for manufacturing the measuring instrument in accordance with FIGS. 1 through 4.

FIG. 10 illustrates the bottom plate 6 of the measuring instrument in a representation similar to that of FIG. 2 in the same condition as that of FIG. 2 in that the bottom plate 6 is combined with the other elements of the indicator unit to form the indicator unit 2. The two tabs 8 have already been bent, and the spring carrier 40 has already been attached to the bottom plate 6 in the manner explained in the foregoing.

As FIG. 10 shows, integral to the bottom plate 6 is a section 88 that transitions into the projection 62, which itself transitions into and is a single piece with the spring end-piece 54. The spring end-piece 54 and the projection 62 are therefore securely joined to the bottom plate 6 in the condition as shown in FIG. 10. As such, the spring end-piece 54 and the projection 62 each have their final form, the form that they should have as components of the finished measuring instrument in accordance with FIGS. 1 through 4. Furthermore, the spring end-piece 54 and the projection 62 are maintained at the bottom plate 6 by means of the section 88 relative to the other elements of the bottom plate 6, especially to the bearing hole 20 for the shaft 30 of the gear segment 32 in those relative positions that are established as target positions for the finished measuring instrument. Particularly, section 88 maintains the position of the spring end piece 54 and the projection 62 relative to the gear segment 32 which is attached to bottom plate 6 by shaft 30.

The elements constituting the projection 62 and the spring end-piece 54 are punched, along with the other elements of the bottom plate 6, from a flat metal sheet and then bent into the desired shape. This is shown with respect to the spring end-piece 54 in FIG. 11, which illustrates the bottom plate 6 in a condition that differs from the condition in accordance with FIG. 10 only in that the elements constituting the spring end-piece have not been bent yet. In the condition in accordance with FIG. 11, the base 56 and the two side walls 58 and 60 of the spring end-piece are still flat in the same plane as the main section of the bottom plate 6. The base 56 and the two side walls 58 and 60 together with the other elements of the bottom plate 6 have been punched in this position. In order to create the spring end-piece 54, starting with the condition shown in FIG. 11, the side wall 58 is bent along a bend-line 90, the base 56 is bent along a bend-line 92, and the side wall 60 is bent along a bend line 94, so that the result is the form of the spring end-piece 54 shown in FIGS. 10 and 2.

The bottom plate 6 as shown in FIG. 10 with the indicator shaft 24 carrying the pinion 28, the shaft 30 carrying the gear segment 32, the preload spring 38, and the top plate 4 are assembled into indicator unit 2. At this point in time, the spring end-piece 54 and the projection 62 are components of the indicator unit because they are attached to the bottom plate 6. After the indicator unit 2 has been assembled, the one end 50 of the Bourdon tube 48 is inserted into the spring carrier 40 and the other end 52 is inserted into the spring end-piece 54. This results in the arrangement illustrated in FIG. 12 comprising the Bourdon tube 48 and the indicator unit 2, to which the spring end-piece 54 and the projection 62 are still attached at this point in time by means of the section 88. While the Bourdon tube 48 assumes the position shown in FIG. 12 relative to the indicator unit 2 and is not deformed by a difference in pressure between its interior and its environment, nor by other forces, the one end 50 is soldered to the spring carrier 40 and the other end 52 is soldered to the spring end-piece 54. These two solderings are preferably performed simultaneously. Since the relative position between the spring end-piece 54 and the bottom plate 6 does not change during this process, the spring end-piece 54 assumes precisely the same target position in this condition as it does when it is soldered to the Bourdon tube 48.

After the soldering has been performed, the spring end-piece 54 and the projection 62 are separated from the bottom plate 6 in that the section 88 is removed. This can be done, for instance, by punching or laser cutting. This results in the finished measuring instrument that has already been addressed in the foregoing using FIGS. 1 through 4. Removing the section 88 does not cause the positions of the spring end-piece 54 and the projection 62 to change relative to the elements of the indicator unit 2 since removing the section 88 has no effect on the form of the Bourdon tube 48, which therefore has the same form both prior to and after the section 88 has been removed. This means that the spring end-piece 54 occupies its target position in the finished measuring instrument with the same high degree of precision that was achieved when the bottom plate 6 was created with the integral spring end-piece 54 (see FIG. 10).

With the measuring instrument manufactured in the manner described in the foregoing, the spring end-piece 54 assumes its target position relative to the indicator unit without any additional calibration being necessary. This increases the indicator accuracy of the gauge equipped with the measuring instrument. If calibration is nevertheless performed in order to increase the indicator accuracy, the complexity associated with this is lower for the invented measuring instrument than for the conventional measuring instruments of the type described in the introduction.

In the method described in the foregoing for manufacturing the measuring instrument, the steps of soldering the one end of the Bourdon tube to the spring carrier, soldering the other end of the Bourdon tube to the spring end-piece, and rigidly joining the one end of the Bourdon tube to the indicator unit are combined into a single manufacturing step. This simplifies the manufacturing method.

FIGS. 8 and 9 illustrate representations of an alternate embodiment of the spring carrier 40 in representations similar to those in FIGS. 3 and 4. As shown in FIGS. 8 and 9, the spring carrier 40 does not include a sleeve but rather a cap 96 that is bent so that it has a U-shaped cross-section made from the same metal sheet as the bottom plate 6 so that it constitutes a single piece with the bottom plate 6. The spring carrier 40 which includes cap 96 can be manufactured in a manner similar to that described for the spring end-piece 54, by bending elements punched from the same metal sheet as is the bottom plate. As can be seen in FIG. 8, the cap 96 projects from the front side of the bottom plate 6, while on the back side of the bottom plate 6 the connecting pin 42 with the bore 44 projects therefrom. In the alternate embodiment the connecting pin 42 is not integral to the spring carrier. Rather, it is a piece finished separately therefrom that is inserted into a hole in the bottom plate 6 and affixed to the bottom plate 6 by caulking.

Additionally in the alternative embodiment of the spring carrier 40, the connecting pin 42 can be affixed to the base 98 of the cap 96 rather than to the back side of the bottom plate 6. The same is true for the embodiment of the spring carrier 40 shown in FIGS. 3 and 4. In this embodiment the connecting pin 42 can embody a lateral projection extending radially from the sleeve 41 rather than an axial extension of the sleeve 41. These modifications to both of the embodiments are advantageous when the measuring instrument is employed primarily in pressure gauges that comprise what is known as a radial device connector.

The embodiments of the spring carrier 40, including its modifications, are distinguished over the prior art by requiring simple production and having small dimensions so that it is easier to design a compact measuring instrument. Therefore the described embodiments of the spring carrier, including its modifications, can be used advantageously in manufacturing measuring instruments in which the spring end-piece is not attached to one of the two plates prior to soldering to the Bourdon tube.

In the exemplary embodiments of the measuring instrument described in the foregoing, the lever section 36 of the gear segment 32 lies immediately adjacent to the leg 66 of the projection 62 that is rigidly joined to the spring end-piece 54. This means that the conventional pull rod is not used. Therefore, the complexity of manufacture and assembly, and the space requirements for the customary pull rod are not encountered. This connection, with no pull rod, between the spring end-piece and the gear segment, can also be employed advantageously in measuring instruments in which the spring end-piece is not attached to one of the two plates prior to being soldered to the Bourdon tube.

Although in the preferred exemplary embodiment of the measuring instrument that is described in the foregoing corresponding to FIGS. 1 through 4 the connection between the gear segment and the spring end-piece is realized without a pull rod, such a pull rod can be used in a modification of the preferred exemplary embodiment. In this case, the L-shaped projection 62 is not used and is replaced by the pull rod. In this variation, the spring end-piece is still a part that is initially attached to one of the plates of the indicator unit and that is not separated until the other end of the Bourdon tube has been soldered to the spring end-piece.

In the exemplary embodiments of the measuring instrument and the methods for manufacturing them that are described in the foregoing, the spring end-piece 54 and the projection 62 are initially joined to the bottom plate 6. Alternatively, they can also initially be joined to the top plate 4, as illustrated in FIG. 13. FIG. 13 shows the top plate 4, the spring end-piece 54, and the projection 62 of the measuring instrument in accordance with FIGS. 1 through 4, while the projection 62 is still joined to the top plate 4 by means of a section 100. The projection 62 and the spring end-piece 54 are integral to the top plate 4 in the same manner as has been explained with reference to FIGS. 10 and 11 in terms of the bottom plate 6. The indicator unit 2 is assembled from the top plate 4 as the top plate 4 is shown in FIG. 13, the bottom plate 6 as it is shown in FIG. 2 but without the spring end-piece 54 or the projection 62, and from the other described elements of the indicator unit 2. The Bourdon tube 48 is then soldered to this assembled indicator unit 2 in the same manner as explained with reference to FIG. 12. Then the section 100 is removed in order to separate the projection 62 and the spring end-piece 54 from the top plate 4. The measuring instrument produced in this manner is the same as that shown in FIGS. 1 through 4 and this measuring instrument and the method for manufacturing it comprise the same advantages as those previously discussed.

In the exemplary embodiment of the measuring instrument explained with reference to FIGS. 1 through 4, the spring carrier 40 is affixed to the bottom plate 6. In accordance with another alternate exemplary embodiment of the measuring instrument, the spring carrier is not affixed to one of the two plates. FIG. 14 illustrates this alternate exemplary embodiment during its manufacture in a representation similar to that of FIG. 12. The only differences between FIGS. 12 and 14 are that, in accordance with FIG. 14, the spring carrier 40 is not affixed to either of the two plates 4 or 6, the bottom plate 6 comprises a recess in the region of the spring carrier 40, and the mounting hole 18 adjacent to the spring carrier 40 is circular. While the Bourdon tube 48 is being soldered to the spring end-piece 54 and to the spring carrier 40, the indicator unit 2, the Bourdon tube 48, and the spring carrier 40 are held in the relative positions shown in FIG. 14 by means of a soldering device (not shown). During this process, the relative position between the indicator unit 2 and the spring carrier 40 coincide with the relative position that the spring carrier 40 and the indicator unit 2 occupy in the pressure gauge. This is also true of the position of rotation of the spring carrier 40 (indicated in FIG. 14 by the double arrow X). In order to maintain its position of rotation, the spring carrier 40 can be provided with a radial projecture 102 that engages a corresponding recess of the soldering device and that afterward engages a recess of the housing when the connecting pin on the spring carrier 40 is placed into the bore 84 of the housing 68.

While the indicator unit 2, the spring carrier 40, and the Bourdon tube 48 are affixed in the soldering device in the manner described in the foregoing, the one end 50 of the Bourdon tube 48 is soldered to the spring carrier 40 and the other end 52 of the Bourdon tube 48 is soldered to the spring end-piece 54. Then section 88 is removed so that the spring end-piece 54 and the projection 62 become separated from the bottom plate 6. Now, since neither the spring carrier 40 nor the spring end-piece 54 is joined to the indicator unit 2, the spring end-piece 54 does not preliminarily assume its target position with respect to the indicator unit 2. However, as soon as the indicator unit 2 and the Bourdon tube 48 have been assembled in the housing 68 of the pressure gauge, the spring end-piece 54 and the projection 62 assume their target positions with respect to the indicator unit 2 because radial projecture 102 engages the recess in the housing 68 and maintains the position of the rotation of the spring carrier 40 with respect to the indicator unit 2.

In most of the embodiments previously discussed, the spring carrier 40 is caulked where it connects to the bottom plate 6 or is integral to it in a single piece and the connection of the spring carrier 40 to the bottom plate 46 is manufactured prior to the indicator unit being assembled. The embodiment of the spring end-piece as a single piece that is affixed to one of the two plates prior to the Bourdon tube being soldered to the spring end-piece and that is separated from this plate after the Bourdon tube has been soldered to the spring end-piece, as provided in the invention, can furthermore also be applied in a measuring instrument that comprises a conventional spring carrier, provided with an integral device connector, to which the indicator unit is bolted. In this case, the assembled indicator unit, to one plate of which the spring end-piece is attached, is bolted to the spring carrier, whereupon the ends of the Bourdon tube are then inserted into the spring carrier and spring end-piece. Once the two ends of the Bourdon tube have been soldered to the spring carrier and the spring end-piece, respectively, the spring end-piece is separated from the indicator unit.

The measuring instrument for a pressure gauge comprises an indicator unit 2 with two plates 4 and 6 that bear rotatably an indicator shaft 24 carrying a pinion 28 and that furthermore bear a gear segment 32. The measuring instrument furthermore comprises a metal Bourdon tube 48 bent into an arc shape, which is soldered on one end to a spring carrier 40 and on the other to a spring end-piece 54 The spring end-piece 54 is connected to the gear segment 32 such that the displacement of the spring end-piece 54 due to the measurement pressure is transferred to the gear segment 32. The spring end-piece 54 constitutes a part that is rigidly attached to one of the two plates 4 and 6 prior to the Bourdon tube 48 being soldered to the spring end-piece 54 and that is separated from this plate once the Bourdon tube 48 has been soldered to the spring end-piece 54. During the course of the manufacture of this measuring instrument, the spring end-piece 54 is produced as a part that is securely joined to one of the two plates 4, 6. The Bourdon tube 48 is soldered to the spring end-piece 54 while the latter is still rigidly affixed to the plate. It is not until after the Bourdon tube 48 is soldered to the spring end-piece 54 that the spring end-piece 54 is separated form the plate. Preferably the spring carrier 40 is integral to or attached to one of the two plates 4 and 6. The spring end-piece 54 assumes its target position with greater accuracy with respect to the indicator unit 2.

What is claimed is:

1. A measuring instrument for a pressure gauge comprising:
   an indicator unit, including:
   a top plate,
   a bottom plate, wherein the top plate and the bottom plate are joined to each other and arranged essentially parallel to and distanced from each other,
   an indicator shaft, including an indicator pin projecting from the top plate,
   a pinion carried on the indicator shaft, and
   a gear segment, wherein the indicator shaft and the gear segment are borne rotatably in and between the top plate and the bottom plate and wherein the gear segment includes:
   a lever section, and
   a toothed section that engages the pinion,
   a spring carrier,
   an arc-shaped Bourdon tube including:
   an interior,
   a first end joined to the metal spring carrier through which a measurement pressure can flow into the interior of the Bourdon tube, and
   a second end; and
   a spring end-piece
   rigidly joined to the second end of the Bourdon tube, wherein the spring end-piece is displaced depending on the measurement pressure applied to said Bourdon tube,
   connected to the lever section such that the displacement of the spring end-piece is transferred to the lever section, and
   is attached to either the top plate or the bottom plate prior to the Bourdon tube being joined to the spring end-piece and is separated from either the top plate or the bottom plate once the Bourdon tube has been joined to the spring end-piece, wherein the either top plate or the bottom plate comprise a plate to which the spring-end piece is attached prior to separation.

2. A measuring instrument as claimed in claim 1, wherein the measuring instrument further includes a section and prior to separation, the section, spring end-piece and the plate to which the spring end-piece is attached prior to separation comprise a metal sheet, wherein the spring end-piece comprises a cap that is bent from the metal sheet and is joined to the plate to which the spring end-piece is attached prior to separation by the section.

3. A measuring instrument as claimed in claim 1, wherein the plate to which the spring end-piece is attached prior to separation is the top plate.

4. A measuring instrument as claimed in claim 1, wherein the plate to which the spring end-piece is attached prior to separation is the bottom plate.

5. A measuring instrument as claimed in claim 1, wherein the spring carrier is attached to either the top plate or the bottom plate and the either top plate or bottom plate comprise a plate to which the spring carrier is attached.

6. A measuring instrument as claimed in claim 5, wherein the spring carrier and the plate to which the spring carrier is attached comprise a single piece made from a metal sheet and the spring carrier is bent into a spring carrier cap having a U-shaped cross-section and includes a spring carrier cap interior.

7. A measuring instrument as claimed in claim 6, further comprising a connecting pin which includes a bore that opens into the spring carrier cap interior.

8. A measuring instrument as claimed in claim 7, wherein the connecting pin is attached to the plate to which the spring carrier is attached, and projects from the plate to which the spring carrier is attached in a direction opposing the spring carrier cap.

9. A measuring instrument as claimed in claim 5, wherein:
   the spring carrier comprises a sleeve including a longitudinal direction, a sleeve interior and a slit, wherein the slit runs in the longitudinal direction for accommodating the first end of the Bourdon tube;

the measuring instrument further comprises a connecting pin, wherein the connecting pin is integral to the sleeve and includes a bore that opens into the sleeve interior.

10. A measuring instrument as claimed in claim 9, wherein the connecting pin runs in the longitudinal direction of the sleeve and through the plate to which the spring carrier is attached, and projects from the plate to which the spring carrier is attached in a direction opposing the sleeve.

11. A measuring instrument as claimed in claim 5, wherein the plate to which the spring carrier is attached is the bottom plate.

12. A measuring instrument as claimed in claim 1, wherein the indicator unit further comprises:

a preload spring that exerts a preload force on the gear segment; and a limit stop connected to the spring end-piece, wherein the limit stop is affected by the lever section of said gear segment due to the preload force.

13. A measuring instrument as claimed in claim 12, wherein the spring end-piece further includes an L-shaped projection;

the limit stop comprises a leg attached to the L-shaped projection, wherein the leg includes a side that faces the spring end-piece and is perpendicular to the top plate and the bottom plate; and the lever section is adjacent to the side that faces the spring end-piece.

14. A measuring instrument as claimed in claim 13, wherein the lever section is U-shaped in a plane parallel to the top plane and the bottom plane.

15. A measuring instrument as claimed in claim 1, wherein the spring end-piece is soldered to the second end of the Bourdon tube.

* * * * *